US006886777B2

(12) United States Patent
Rock

(10) Patent No.: US 6,886,777 B2
(45) Date of Patent: May 3, 2005

(54) COAXIAL HELICOPTER

(75) Inventor: Eugene F. Rock, New Port News, VA (US)

(73) Assignee: Airscooter Corporation, Henderson, NV (US)

( * ) Notice: Subject to any disclaimer, the term of this patent is extended or adjusted under 35 U.S.C. 154(b) by 25 days.

(21) Appl. No.: 09/782,941

(22) Filed: Feb. 14, 2001

(65) Prior Publication Data

US 2002/0109044 A1 Aug. 15, 2002

(51) Int. Cl.$^7$ .............................................. B64C 27/10
(52) U.S. Cl. ................................................... 244/17.23
(58) Field of Search .......................... 244/17.19, 17.23, 244/17.11

(56) References Cited

U.S. PATENT DOCUMENTS

| | | | |
|---|---|---|---|
| 1,378,112 A | | 5/1921 | Hewitt |
| 1,568,765 A | | 1/1926 | Ortego |
| 1,786,576 A | * | 12/1930 | Nelson |
| 1,848,306 A | * | 3/1932 | Bluhm |
| 1,849,235 A | | 3/1932 | Kibbe |
| 1,887,429 A | | 11/1932 | Price |
| 2,074,342 A | | 3/1937 | Platt |
| 2,388,653 A | | 11/1945 | Hays |
| 2,395,610 A | | 2/1946 | Cavallaro |
| 2,480,806 A | | 8/1949 | Desmoulins |
| 2,486,059 A | | 10/1949 | Penecost |
| 2,487,020 A | | 11/1949 | Gilcrease |
| 2,496,857 A | | 2/1950 | Cronstedt et al. |
| 2,950,074 A | * | 8/1960 | Apostolescu |
| 3,096,953 A | | 7/1963 | Koump |
| 3,417,825 A | * | 12/1968 | Ramme |
| 3,554,467 A | | 1/1971 | Yowell |
| 3,690,597 A | | 9/1972 | Di Martino |
| 3,765,622 A | * | 10/1973 | Haines |
| 3,841,351 A | | 10/1974 | Bielawa |
| 3,933,324 A | * | 1/1976 | Ostrowski |
| 4,084,345 A | | 4/1978 | Tanaka |
| 4,531,692 A | | 7/1985 | Mateus |
| 4,660,785 A | * | 4/1987 | Munski |
| 4,913,376 A | | 4/1990 | Black |
| 4,928,907 A | | 5/1990 | Zuck |
| 5,039,031 A | | 8/1991 | Valverde |
| 5,058,824 A | | 10/1991 | Cycon |
| 5,065,959 A | | 11/1991 | Bhatia et al. |
| 5,149,012 A | | 9/1992 | Valverde |
| 5,167,384 A | | 12/1992 | Krepak |
| 5,259,729 A | | 11/1993 | Fujihira et al. |
| 5,284,454 A | | 2/1994 | Randolph |
| 5,344,100 A | | 9/1994 | Jaikaran |
| 5,370,341 A | * | 12/1994 | Leon |
| 5,381,985 A | | 1/1995 | Wechsler et al. |
| 5,383,810 A | | 1/1995 | Loving |
| 5,556,355 A | | 9/1996 | Ostrowski |
| 5,791,592 A | | 8/1998 | Nolan |
| 5,915,649 A | | 6/1999 | Head |
| 6,182,923 B1 | | 2/2001 | Weinhart |
| 6,293,492 B1 | | 9/2001 | Yanagisawa |

FOREIGN PATENT DOCUMENTS

| | | | | |
|---|---|---|---|---|
| DE | 750975 | * | 6/1944 | .............. 244/17.11 |
| DE | 1556795 | * | 8/1970 | .............. 244/17.23 |
| SE | 172026 | * | 7/1960 | .............. 244/17.23 |

OTHER PUBLICATIONS

Cox Model Helicopter, "Attack Cobra", date unknown (see attached).

* cited by examiner

Primary Examiner—Tien Dinh
(74) Attorney, Agent, or Firm—Thorpe, North & Western, LLP

(57) ABSTRACT

A coaxial helicopter, comprising a first rotor carried by a first shaft and a second rotor carried by a second shaft; wherein one of the first and second rotors has cyclic pitch control and the other rotor does not have cyclic pitch control, at least pitch and roll control being implemented by cyclic blade pitch control of only one rotor of the coaxial rotor set. Provisions for yaw control can include differential collective control of the first and second rotors, providing yaw paddles and/or a tail rotor, ducted fan, or an air jet configured for yawing the coaxial helicopter.

27 Claims, 13 Drawing Sheets

COAXIAL HELICOPTER

BACKGROUND

1. Field of the Invention

The invention relates to helicopter flight control systems. More particularly, the invention relates to a flight control system arrangement for a coaxial helicopter vehicle.

2. Description of Related Art

Coaxial helicopters have been known for many years. However, because of difficulties involved in the control of cyclic and collective pitch of rotor blades in a coaxial configuration, development of this type of aircraft has heretofore been limited. Conventional coaxial designs provide roll, pitch and yaw control by providing control input linkages for cyclic and collective pitch to both an upper rotor and a lower rotor of a coaxial rotor set. This has conventionally involved providing at least two swash plates; one below, and one above, the lower rotor, to transfer control inputs past the lower rotor to the upper rotor, which is rotating in the opposite direction.

Several successful coaxial designs have been developed, for example, those by Nikolai Kamov and the Kamov Design Bureau of the former Soviet Union. The Kamov organization continues to produce coaxial helicopters in the Russian Federation. Other coaxial designs exist, for example a small coaxial pilotless craft developed by United Technologies Corporation of Hartford, Conn. An example of the control system for this latter craft is disclosed in U.S. Pat. No. 5,058,824.

Coaxial designs are advantageous because they eliminate need for a tail rotor, and are generally more efficient. With a coaxial design, one way of providing yaw control is to provide a differential collective blade pitch control. Pitch is increased in one rotor, and decreased in the other, to unbalance torque. Another way of providing yaw control is to place one or more airfoils in the rotor set downwash. The airfoils are tiltable with respect to the downwash. The airfoils, nominally set to provide minimal air resistance in the downwash, intercept and redirect the downwash from the rotor set by tilting in one direction or the other from this initial position. This creates a reaction force vector at a location away from a yaw axis of rotation of the airframe; and tends to yaw the airframe right or left depending on which way the airfoils are tilted. An example of such a system is disclosed in U.S. Pat. No. 5,791,592, issued Aug. 11, 1998 to Nolan, et al. In the Nolan system there is no cyclic blade pitch control, as pitch and roll control are provided by tilting the rotor set with respect to the airframe; thus deflecting the thrust vector from the rotor set with respect to the airframe to pitch and roll the aircraft.

SUMMARY

It has been recognized that simplifications in design, and the weight and cost savings realized, argue for a further simplified control system in a coaxial rotor helicopter. Commensurate potential advantages of performance achieved for the same or lower cost also argue for simplification in design. The invention is directed to this end, and provides a helicopter control system for a helicopter having a coaxial rotor set, comprising a first rotor carried by a first shaft, and a second counter-rotating rotor carried by a second shaft, wherein the first rotor has cyclic pitch control, the second rotor does not have cyclic pitch control. In a further more detailed aspect, a yaw control is provided, comprising for example a differential collective blade pitch control, a tail rotor optimized for yaw control, and/or an airfoil, or a plurality of airfoils, disposed in a downwash from the rotor set. The airfoils are configured to be actuatable to deflect downwash so as to provide a yaw control.

In a further detailed aspect, the mentioned collective blade pitch control can be provided for the first and second rotors in addition to a cyclic pitch control for one of them. In further detail, a differential collective control can be provided with a collective pitch control to both rotors in addition to cyclic pitch control to one rotor, to provide a yaw control. This yaw control by collective pitch input is accomplished by providing a counterbalancing difference in pitch, and thereby a differential rotational resistance between the upper and lower rotors of the coaxial rotor set, which induces yaw of the aircraft without changing the rotor set thrust vector.

In a further more detailed aspect, the coaxial rotor set can be configured so that a cyclic pitch control is provided for a lower rotor, and no cyclic or collective pitch control is provided to the upper rotor. In a further more detailed aspect, cyclic pitch control can be provided to the lower rotor and collective pitch control can be provided to the upper and lower rotors. In further detail in this latter case, a collective pitch control can be provided to the upper rotor by means of at least one collective control rod disposed within a tubular rotor driveshaft operatively coupled to the upper rotor of the coaxial rotor set. The control rod(s) can be linked to a thrust bearing at a bottom end enabling the rod to be pushed up and down. The rod(s) can be made to rotate with the rotor, and this eliminates need for a swash plate adjacent the upper rotor. In another more detailed aspect, a swashplate can be provided below the lower rotor to provide cyclic control inputs to the lower rotor. As an alternative to providing one or more control rods through the center of the upper rotor driveshaft, an actuator can be provided adjacent the upper rotor and linked to control arms of the upper rotor blades through a swashplate to provide collective pitch control of the upper rotor. Control and power signals to the actuator, for example hydraulic or electrical, can be fed through a non-rotating central coaxial tube through a tubular upper rotor driveshaft of the coaxial rotor set which carries the actuator.

In another detailed aspect, cyclic pitch control can be provided to the upper rotor only, and no cyclic or collective pitch control provided for the lower rotor. This can be by means of at least one control rod extending within the rotor driveshaft of the upper rotor. In another more detailed aspect, a wobble plate can be operatively coupled to the one or more control rods. Alternatively, two actuators, one for pitch and one for roll, can be provided adjacent the upper rotor and linked to control arms of the blades through a swashplate to provide cyclic pitch control. In further detail, a collective pitch control can also be provided to the upper and lower rotors in combination with cyclic control for the upper rotor. Collective control of the lower rotor can be by means of a swashplate operatively coupled to control rods.

In another more detailed aspect, cyclic pitch control can be provided to either the upper or lower rotor, and collective pitch control provided to both rotors of the coaxial rotor set. In a further detailed aspect, a differential collective control can be provided, where a difference in collective blade pitch is provided for the upper and lower rotors, thereby providing a yaw control input by means of resulting differential torque in the rotor set, while keeping the magnitude of the rotor set thrust vector substantially the same. In a further more detailed aspect, a yaw paddle comprising an airfoil disposed in the downwash of the coaxial rotor set, or multiple yaw paddles, can be provided for a yaw control. The latter means of yaw control can be instead of, or in combination with, differential collective control. In further detail, in one simple arrangement, cyclic pitch control can be provided to one (upper or lower) of the rotors for pitch and roll control, and no collective control is provided; and in combination, one or more tiltable airfoils are provided in the rotor set downwash to provide yaw control.

In a further detailed aspect, yaw control can be provided or supplemented by a tail rotor. Such a tail rotor does not draw power constantly, but only for brief periods of time in order to provide yaw control. For at least this reason, the tail rotor can be small, and can comprise a ducted fan. Moreover, in further detail, variations can include providing yaw paddles to supplement the tail rotor and provide directional stability, and replacing the tail rotor with an air jet.

Further details, features, and advantages will become apparent with reference to the following detailed description, taken in conjunction with the accompanying drawings, which illustrate, by way of example, such details, advantages and features of the invention.

BRIEF DESCRIPTION OF THE DRAWINGS

Like reference numbers refer to like elements in the different embodiments shown in the figures.

DETAILED DESCRIPTION OF THE PREFERRED EMBODIMENT(S)

Figure 1:
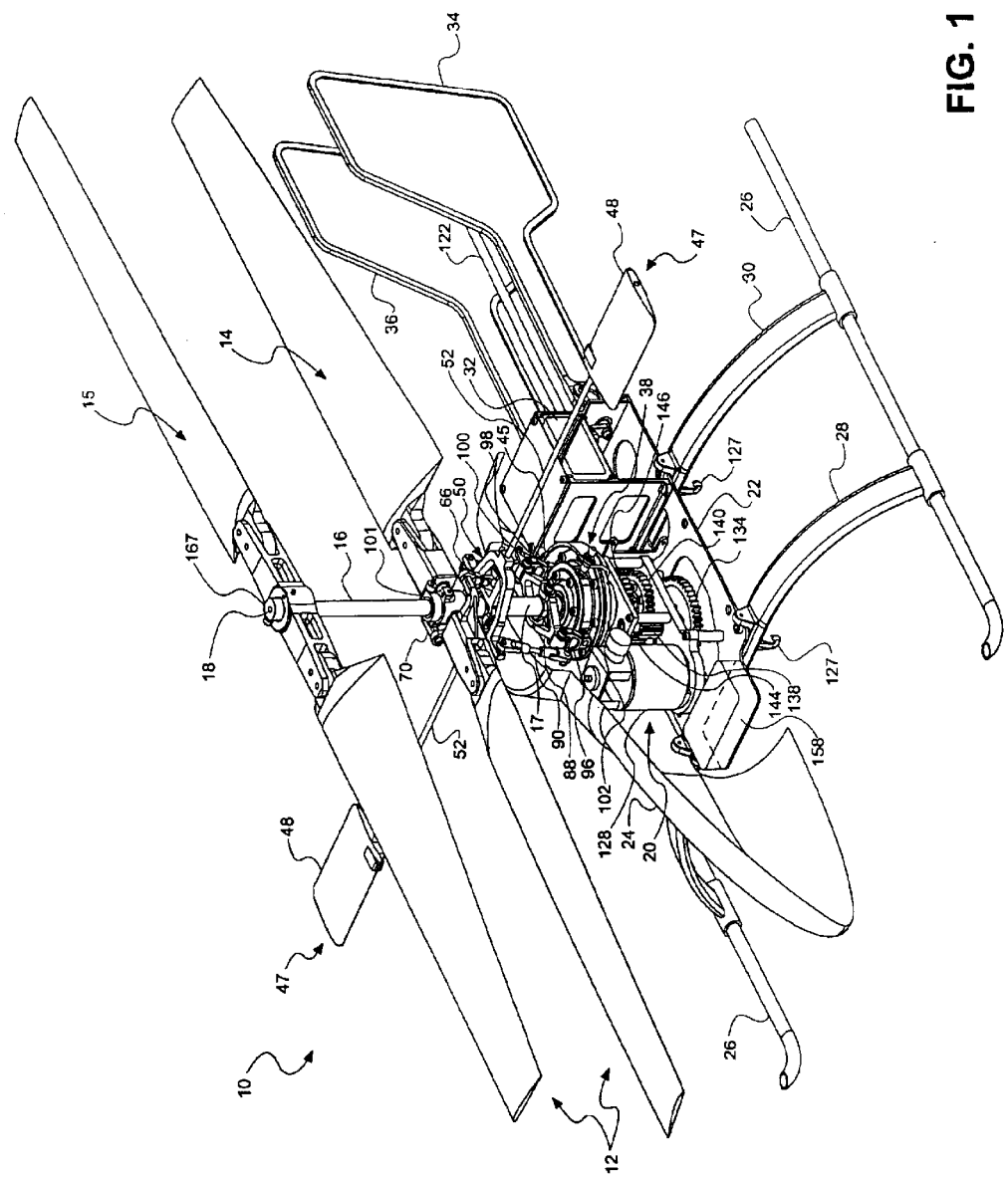
FIG. 1 is a top-front-right perspective view, partially in cut-away, of a coaxial helicopter in accordance with principles of the invention, shown without certain elements, e.g., the motor controller, batteries, wiring, connectors, and the like, which have been omitted for clarity.

With reference to FIGS. 1, 2, 3 and 4 of the Drawings, which are provided by way of illustration, and not by way of limitation, the invention is embodied in a helicopter 10 comprising a coaxial rotor set 12 including a lower rotor 14 and an upper rotor 15 which are carried and actuated by an outer drive shaft 16 and an inner drive shaft 18, respectively. An outer tube 17 overlays the outer driveshaft, and will be further described below. The driveshafts are powered by a power assembly 20 carried by an airframe 22 comprising all supporting structure of the aircraft to which the various components are attached or are ultimately carried by.

The illustrated embodiment is a model helicopter 10, but as will be appreciated, the invention can be incorporated in larger aircraft. The model aircraft includes a canopy 24 which is supported by the airframe 22 and provides an outer covering for the helicopter, and which may be shaped and painted to resemble a full-sized helicopter. The helicopter further comprises landing skids 26 attached to the airframe by supporting fore and aft supporting arms 28 and 30, respectively.

Because the illustrated embodiment is a model, a radio receiver 32 is provided, being mounted on the airframe aft of the power assembly. The radio receiver provides control signals to actuators, comprising proportional servos, as will be discussed in further detail below.

The helicopter 10 is controlled by providing cyclic pitch control to the lower rotor 14 to provide for pitch and roll control inputs, and by use of yaw paddles 34, 36 comprising airfoils disposed in the downwash from the rotor set 12. In this way, control of the helicopter is simplified, as control linkages do not extend upwardly past the lower rotor 14, and a single swash-plate 38 is needed, rather than the multiple swash plate assemblies and attendant linkages, etc., conventionally required with coaxial designs.

The swash plate 38 is an in-line design, with a uniball 40 rigidly mounted to the airframe by way of supporting structure in the power assembly 20. The swash plate is actuated by control linkages 42, 44 connected to the swash plate conventionally by ball joints 45 positioned 90 degrees apart with respect to the axis of rotation of the driveshafts 16, 18 and the swash plate 38. These control linkages provide pitch and roll control, and are actuated by actuators comprising proportional servos 46, 48 respectively.

For clarity of presentation in the drawing figures, the means of preventing rotation of the swash plate 38 with respect to the uniball 40 is not shown, but comprises slots (not shown) formed in the uniball which cooperate with protrusions such as rods (not shown) extending to inwardly from the swashplate into the slots; and the interaction of the rods and slots prevents rotation. The rods are free to slide in the slots to allow tilting of the swashplate, but the rods resist forces tending to rotate the non-rotating portions of the swashplate around the uniball.

Cyclic pitch control is transferred to the lower rotor 14 by means of a Hiller paddle assembly 47. As can be appreciated, the paddle assembly can be modified so as to provide an assembly configured to function as a Bell-Hiller ("Beller") control system if desired, as is known in the art. Other known cyclic pitch control schemes can be substituted, as will be appreciated by those skilled in the art.

Figure 2:
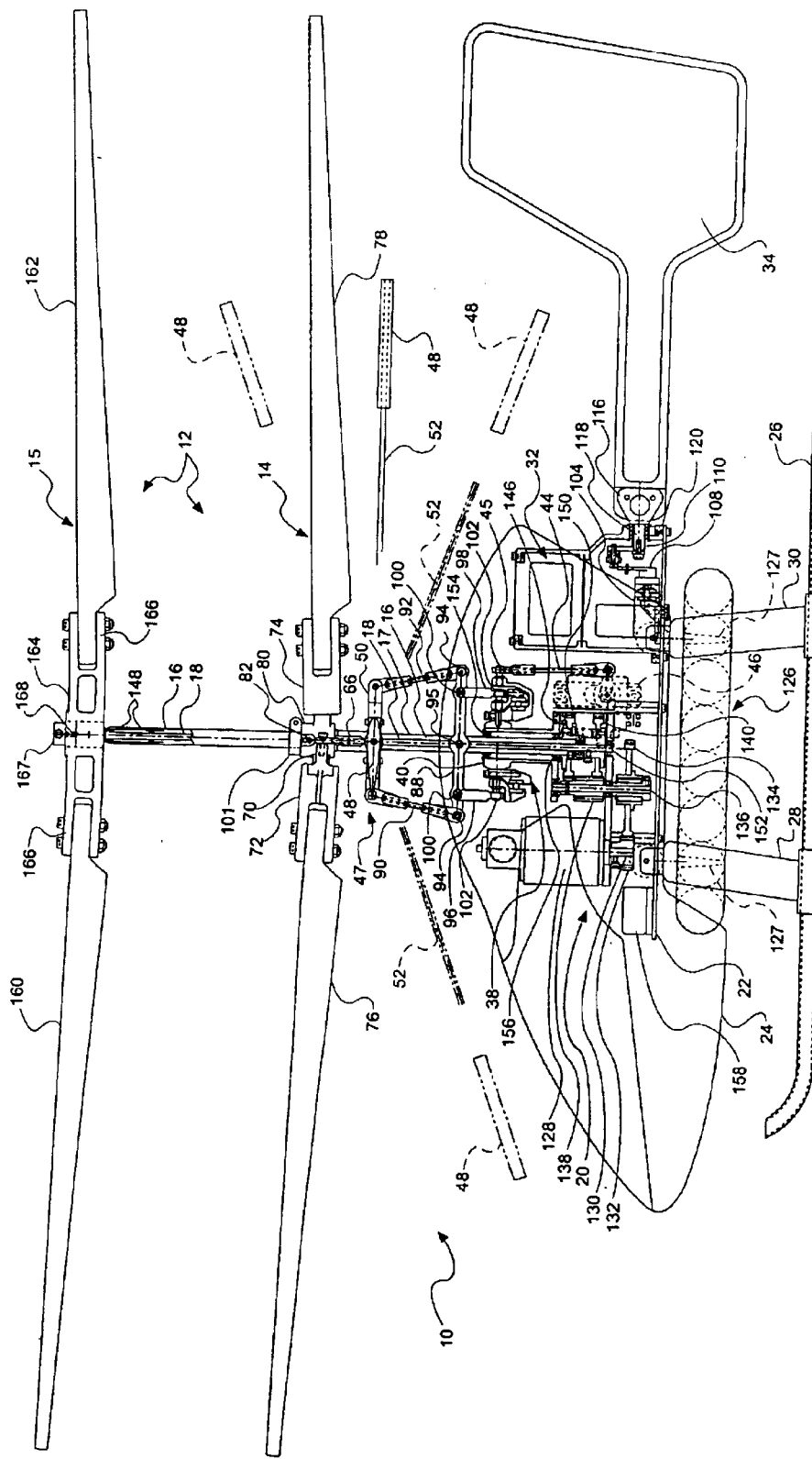
FIG. 2 is a side elevation view, partially in cut-away, the illustrated embodiment being shown without certain conventional elements to more clearly illustrate features of the design, e.g. wiring, electrical connectors, and the like, are omitted so that salient features of the elements of the invention can be more easily seen.
Figure 4:
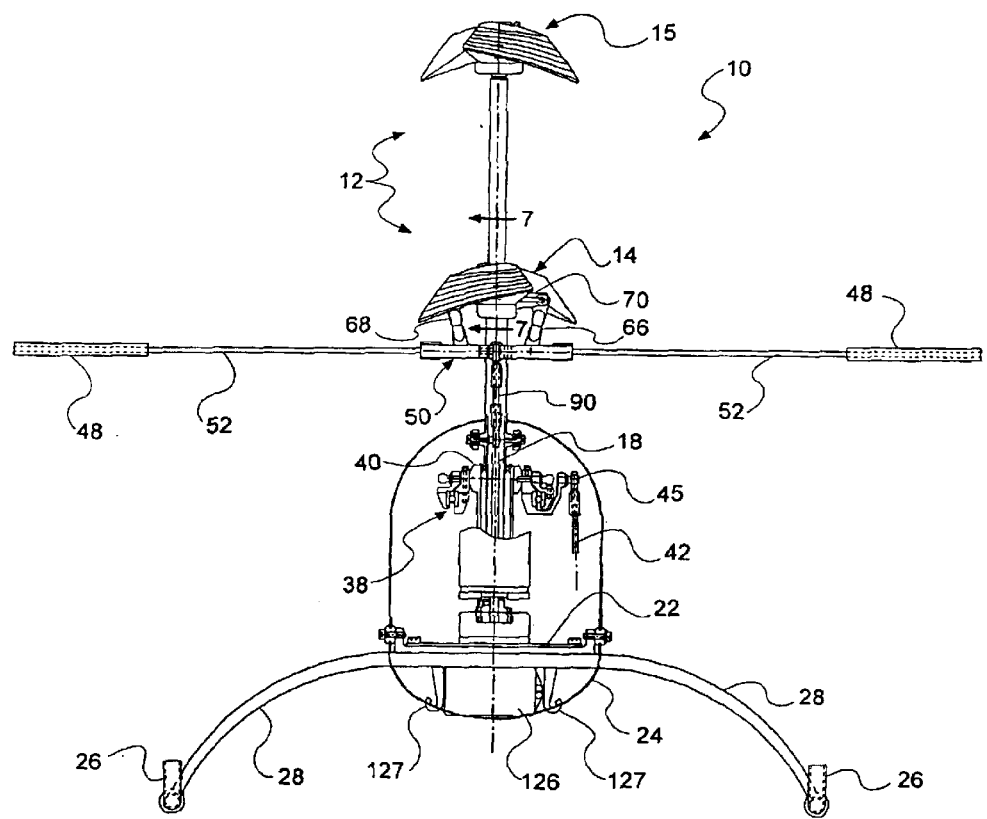
FIG. 4 is a front elevation view, partially in cut-away, of the helicopter of FIG. 1; again certain elements are omitted for clarity, but are shown in other views if not trivial.
Figure 5:
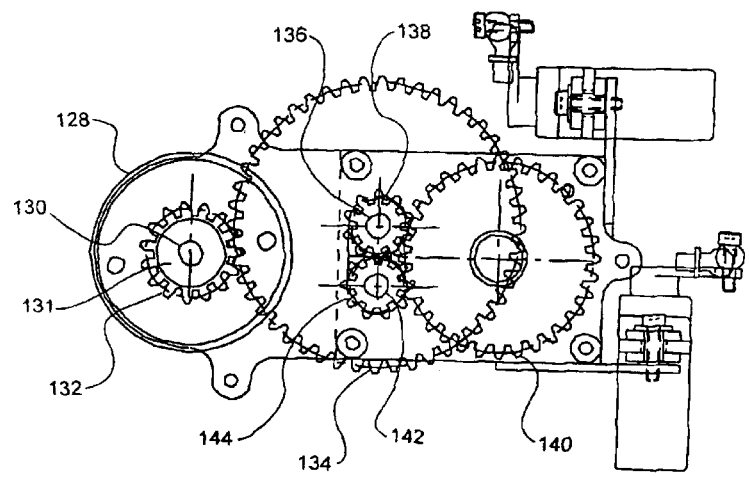
FIG. 5 is a bottom view, partially in cut-away of a power assembly and pitch and roll control servos of the helicopter of FIG. 1; connecting structure and surround elements are omitted for clarity.
Figure 6:
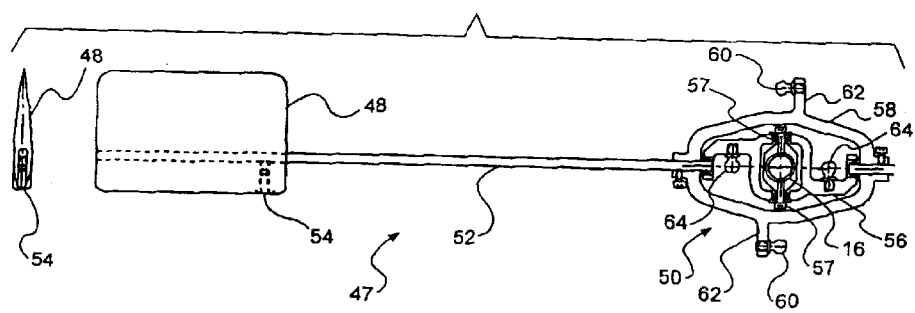
FIG. 6 is a plan view, partially in cut-away, of a Hiller paddle assembly of the helicopter of FIG. 1; connecting structure and surrounding elements omitted for clarity, and a end view of the paddle included for clarity.
Figure 7:
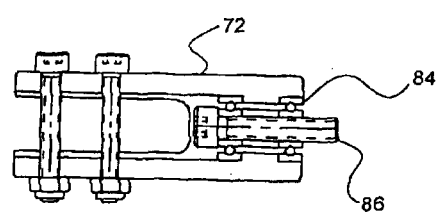
FIG. 7 is a cross-sectional view, taken along line 7—7 in FIG. 4, of a rotatable rotor blade cuff assembly; the rotor and hub connected thereto being omitted for clarity.

With reference to FIG. 6, in addition to FIGS. 1, 2 and 4, the paddle assembly 47 further comprises paddles 48 connected to a rocker assembly 50 by rods 52. The paddles are fixed by means of set screws 54 which cooperate with flats (not shown) provided on the rods. This provides a "factory set" fixed pitch for the Hiller paddles.

The rocker assembly 50 is attached to the outer tube 17 overlaying the outer driveshaft 16 by pins 57. The rocker assembly further comprises an inner rocking element 56 which teeters about the pins 57 and is rotatably connected to an outer rocking element 58 which rotates about an axis normal to a teetering axis of rotation provided by the pins 57. As will be appreciated, the configuration provides teetering about two axes, and these axes intersect at a point on the axis of rotation of the assembly 50.

Control inputs come into the Hiller paddle assembly 47 by means of ball joints 60 carried by arms 62 of the outer rocker element 58. Control outputs to the lower rotor 14 are by means of further ball joints 64 carried by the inner rocker rocking element 56, through blade pitch control links 66, 68 operatively coupled to blade pitch control arms 70 extending laterally from rotatable rotor cuffs 72, 74 coupled to the lower rotor blades 76, 78, respectively.

The pitch housings 72, 74 are rotatably connected to a hub 80 teeterably connected to the outer sleeve 17 by teetering pins 82 disposed near the top of the hub. The configuration provides an underslung teetering hinge arrangement for the lower rotor 14. The blades 76, 78 are disposed so as to provide slight coning of the rotor 14; and it should be noted that the upper rotor 15 is also slightly coned at the same angle.

Further details of the arrangement will be appreciated with reference to FIG. 6. The illustrated rotor blade cuff 72 is connected to the hub 80 (not shown) through a bearing 84 having an axis of the rotation and a bolt 86 coaxial with the axis rotation of the cuff and attaching it to the hub.

Returning to FIGS. 1, 2 and 4, it will be appreciated that the paddle assembly 47 is coupled to the swash plate 38 by means of a linkage arrangement including a teetering lever 88 operatively coupled to the paddle assembly by control linkages 90, 92 attached to the outer rocking element 58 of the paddle assembly by ball joints 60 as previously set forth. The lower ends of the control linkages 90, 92 and attached to the teetering lever 88 by ball joints 94 as well. The teetering lever is attached to the overlaying outer tube 17 by pins 95, and to the swash plate by further control links 96, 98. These further control linkages also are attached to the teetering lever 88 by pins 100, and at the lower ends to the swash plate by ball joints 102. It will be appreciated that this arrangement provides control inputs to the lower rotor 14 with very little force; enabling the servos 46, 48 to be of low power, and of small size and weight.

It will be noted that the overlaying outer tube 17 transmits rotational forces to, and carries, the control linkages, specifically the teetering lever 88 and rocker assembly 50 of the Hiller paddle assembly 47. This saves tapping the outer driveshaft 16 and allows it to be stronger and lighter. The outer tube is attached to the outer driveshaft by a clamp 101 disposed above the top of the hub 80 of the lower rotor 14. In the illustrated embodiment the rotor hub is also disposed on the outer tube, and power is transferred by friction from the outer shaft to the outer tube, and then power is transferred to the hub by teetering pins 82 carried by the outer tube and which teeteringly carry the hub in underslung fashion. Again, this saves taping the driveshaft 16, which consequently can be made lighter. The outer shaft continues upwardly and terminates just below the upper rotor 15.

Dampers formed of rubber or other elastomeric material comprising O-rings (not shown) are provided for the upper and lower rotors 14, 15. For example, in the lower rotor the damper is disposed between the hub 80 of the lower rotor and the outer tube 17. This allows limited teetering; but dampens and cushions the limits of teetering motion of the lower rotor 14. The amount of teetering of the upper and lower rotors is limited so as to prevent the possibility of interference of the rotors. The more teetering allowed, the more separation must be provided between the upper and lower rotors.

As will be appreciated, in another embodiment (not shown) collective pitch control could be provided by adding a collective control that moves the uniball 40 and swash plate 38 up and down, as well as providing control linkages to collectively control the pitch of the upper rotor blades. For example, a rod that extends through a tunnel provided in the inner drive shaft 18 could be actuated by a thrust bearing from below the power assembly 20, the rod being operatively coupled to control arms which would be provided for the upper blades to alter their pitch collectively. Moreover, in this embodiment a differential collective control input increasing the pitch of the blades of one rotor while decreasing that of the blades of the other can be used to provide a yaw control input to supplement or replace that provided by the yaw paddles 34, 36.

Figure 3:
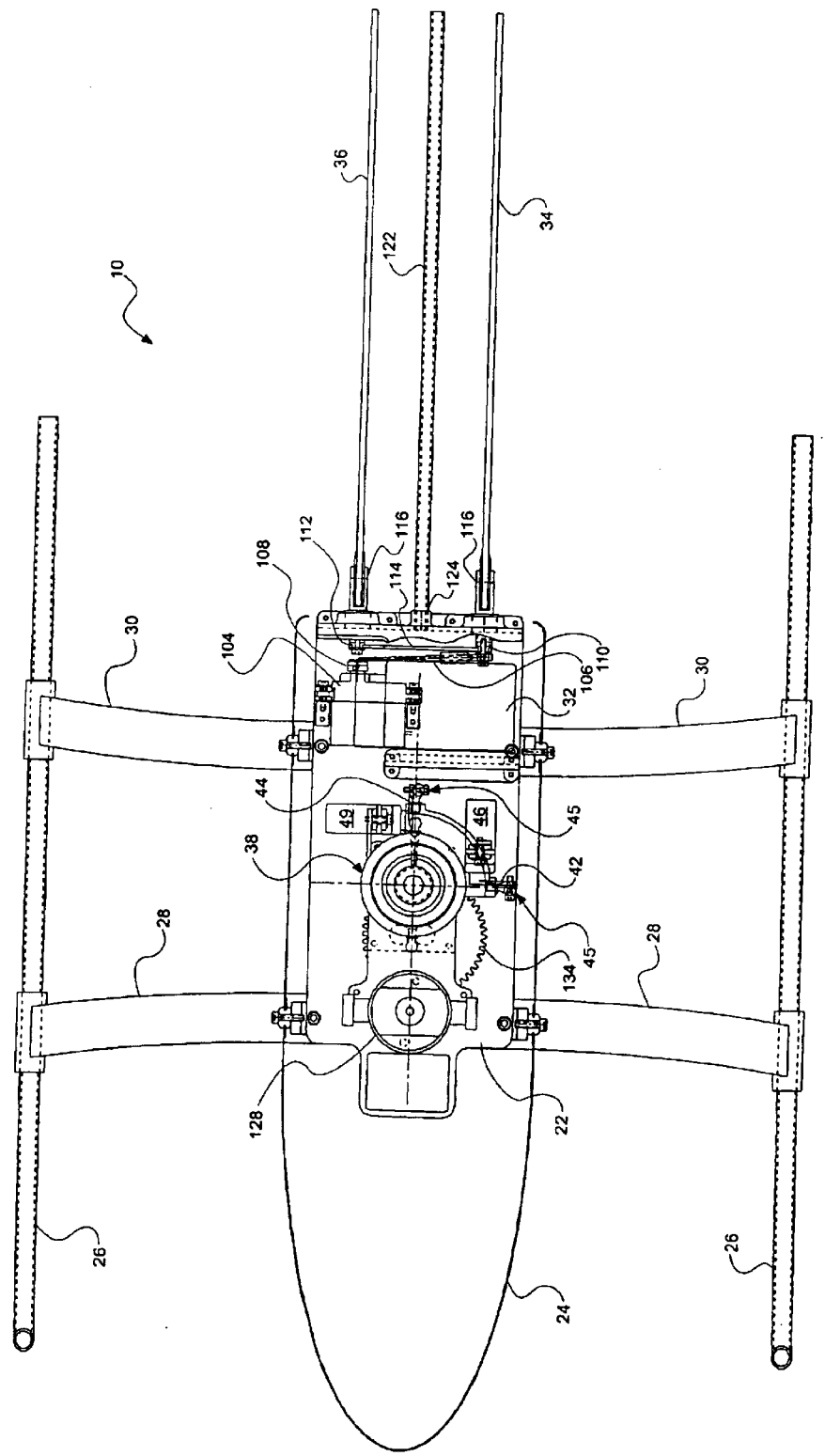
FIG. 3 is a plan view partially in cut-away of the helicopter shown in FIG. 1; again certain features, for example the rotors, are omitted to more clearly show other elements; salient features omitted are shown in the other FIGS.

With reference to FIGS. 1, 2 and 3, yaw control in the embodiment illustrated therein is provided only by yaw paddles 34, 36 as mentioned previously, rather than by conventional means for coaxial helicopters such as differential collective control. The yaw paddles are rotatably mounted to the airframe 22 and are actuated by a yaw control servo 104. A yaw control link 106 is disposed between two cranks 108, 110 operably connected to the yaw control servo 104 and a yaw paddle 34, respectively. The crank 110 attached to said one of the yaw paddles (34) is further operably connected to a second crank 112 which actuates the other yaw paddle 36 by means of a further link 114. By this arrangement the yaw paddles rotate simultaneously by the same amount, and remain parallel to each other. The yaw paddles are connected to the cranks by means of cuff elements 116, each cuff element further comprising a stem 118 rotatably received by a sleeve bearing 120 fixedly disposed on the airframe 22. This arrangement allows the yaw paddles to rotate parallel to a roll axis of the aircraft, but not to rotate about other axes or to translate with respect to the airframe, whereby induced reaction forces caused by inclining the yaw paddles in the downwash from the rotors are transferred to the airframe.

In one embodiment a rate gyro can be used in connection with the yaw control proportional servo 104. This corrects for induced yaw from sources such as cross winds or cyclic control inputs, which induced yaw movements are not intended by the operator. The rate gyro operates essentially in a manner similar to that which it would if it controlled tail rotor collective in a conventional helicopter; but instead, it is configured to alter the "pitch" of the yaw paddles 34 which is analogous to tail rotor collective pitch in the control system of a conventional helicopter. A heading-hold gyro can also be used, which serves to keep the aircraft pointed in the direction last input by the operator, until new operator input changes the heading; and the heading-hold gyro also uses the yaw servo and yaw paddles to make corrections. A combination of a rate gyro and heading-hold gyro can be used as well, for increased ease of operation and increased stability.

As mentioned, control signals are received by the radio receiver 32 which is electrically operatively coupled to each of the control servos 46, 48, 104. The receiver is electrically connected to an antenna 122 disposed between the yaw paddles 34, 36. This arrangement shields the antenna from view. The antenna is supported by the airframe 22, to which it is attached at a forward attachment end 124. Details of the various possible radio-control arrangements and gyro implementations are conventional and many possible implementations and variations are well known to those skilled in the arts of helicopter control and helicopter radio-controlled modeling, and will not require repetition herein.

The receiver 32 is powered by a battery pack 126 carried by the airframe 22 underneath the power assembly 20. Hooks 127 extending from the airframe receive elastomeric bands (not shown) which sling underneath and pull and hold the battery pack tightly against the airframe. The battery pack also provides electrical power for the power assembly. The position of the battery pack, as well as the power assembly and the other elements of the helicopter 10, are selected so as to provide weight balance fore and aft, and transversely left to right with respect to the axis of rotation of the coaxial rotor set 12.

With reference to FIGS. 1 through 5, further details of operation of the helicopter 10 will be discussed. The power assembly 20 further comprises a DC brushed electric motor 128. An example of a suitable motor is an Astro-05 cobalt motor, available from Astro Flight Inc. of Marina Del Rey, Calif. The motor has an output shaft 130 carrying a pinion drive gear 132 via an overrunning clutch, or sprag, 131 disposed between the output shaft and the pinion drive gear, which drives a larger reduction idler gear 134, providing a reduction gear set. The larger reduction idler gear is disposed on a first idler shaft 136 which also carries a first idler pinion gear 138 coupled to transfer power to an inner drive shaft gear 140 operatively coupled to the inner drive shaft 18 driving the upper rotor 15.

A second idler shaft 142 is provided, carrying a second idler pinion gear 144 operatively coupled to the first idler pinion gear 138, and is also operatively coupled to an outer drive shaft gear 146 coupled to the outer driveshaft 16, providing power to the lower rotor 14. The idler pinion gears are displaced axially so that they will mesh with each other, but will mesh only with the driveshaft gear each one respectively drives, and each clears the other drive shaft gear it does not drive. As will be appreciated by those skilled in the art, the inner and outer driveshafts, as well as the first and second idler shafts, are carried by bearings or bushings in turn carried by the airframe and/or further structure of the power assembly 20 coupled to the airframe. These bearings are conventional, and comprise sleeve or roller bearings as required.

As mentioned above, in the illustrated embodiment the outer drive shaft 16 extends from the power assembly 20 past the lower rotor 14 to the base of the upper rotor 15. A set of bearings 148 are provided between the inner shaft 18 and the outer shaft 16 at this location. This arrangement provides a stiffer driveshaft arrangement for the upper rotor 15. A bearing 150 is also provided between the inner and outer shaft at a lower end of the outer shaft. A bearing 152 is also provided at a lower end of the inner driveshaft 18 where it is rotatably coupled to the airframe. Furthermore, bearings 154, 156 are provided in the power assembly between the supporting structure of the uniball 40, and the outer driveshaft 16. These arrangements provide for smooth and effective power transmission from the electric motor 128 to the coaxial rotor set 12.

A motor controller 158 is provided to allow control of motor speed, and thereby the magnitude of the thrust vector of the coaxial rotor set 12, from control inputs received through the receiver 32. The motor controller can be, for example, a Castle Creations Pegasus-35H available from Castle Creations, Inc. of Olathe, Kans.

Turning now to more detailed discussions of the upper rotor 15, upper rotor blades 160, 162 are attached to a rotor hub 164 comprising cuffs 166 griping roots of the blades. As mentioned, the upper rotor is slightly coned at the same angle as the lower rotor. The hub 164 further comprises a teetering connection, via an inner hub element 167, to the inner drive shaft 18 by a pivotable connection on each side by teetering pins 168 positioned adjacent the top of the hub, providing an underslung rotor; and facilitating teetering of the upper rotor 15. At least one O-ring formed of rubber or another elastomeric material (not shown) similar to that provided on the lower rotor hub 80 is provided to limit and damp teetering of the upper rotor 15.

The pitch of the blades of the upper rotor 15 is set equal to or slightly greater than a nominal (no control input) pitch of the blades of the lower rotor 14. This is to balance the additional drag on the lower rotor arising from the friction and drag associated with the swash plate 38 and control linkages (e.g. 88, 90, 92, 96, 98), as well as the Hiller paddles 48 and associated Hiller assembly 50 and bars 52. This is contrary to conventional coaxial rotor sets wherein the pitch of the lower rotor blades is matched to that of the upper blades or set slightly greater than the upper blades because at least part of the lower rotor disk is receiving a downdraft from the upper rotor. The upper and lower rotors can also be of different sizes to compensate for differences in drag and/or lift between the upper and lower rotors.

It has been found that by providing a cyclic control input to one rotor 14, and not the other 15, a small amount of yaw is induced. This is due to the fact that drag varies as an exponential function of blade pitch, not as a linear function, and that some increased drag of the cyclic-controlled rotor relative to the other rotor will result from a cyclic pitch change. The direction of the induced yaw will be opposite to the direction of rotation of the cyclically controlled rotor 14 in the FIGS.). This can be canceled out by a corresponding adjustment in yaw paddle inclination. A rate gyro, and/or heading-hold gyro (not shown) can be incorporated in a control system to facilitate corrections for induced yaw.

These arrangements provide a coaxial control system which allows control inputs for pitch, yaw, and roll in a more simplified arrangement than previous coaxial designs. The conventional wisdom dictated that control inputs to a coaxial rotor set should be evenly distributed, that is to say, given equally to the upper and lower rotors. It has been found that the before-described arrangement provide good control of the helicopter 10, simplifying the control system, and reducing weight and cost.

It will be appreciated from the description of additional embodiments that will now be set forth that the way the system is implemented can vary considerably. As with the embodiment discussed above, the operative principles can be applied to aircraft of various sizes, including those in a range from small remotely-piloted vehicles to relatively larger aircraft capable of carrying people and cargo.

Figure 8:
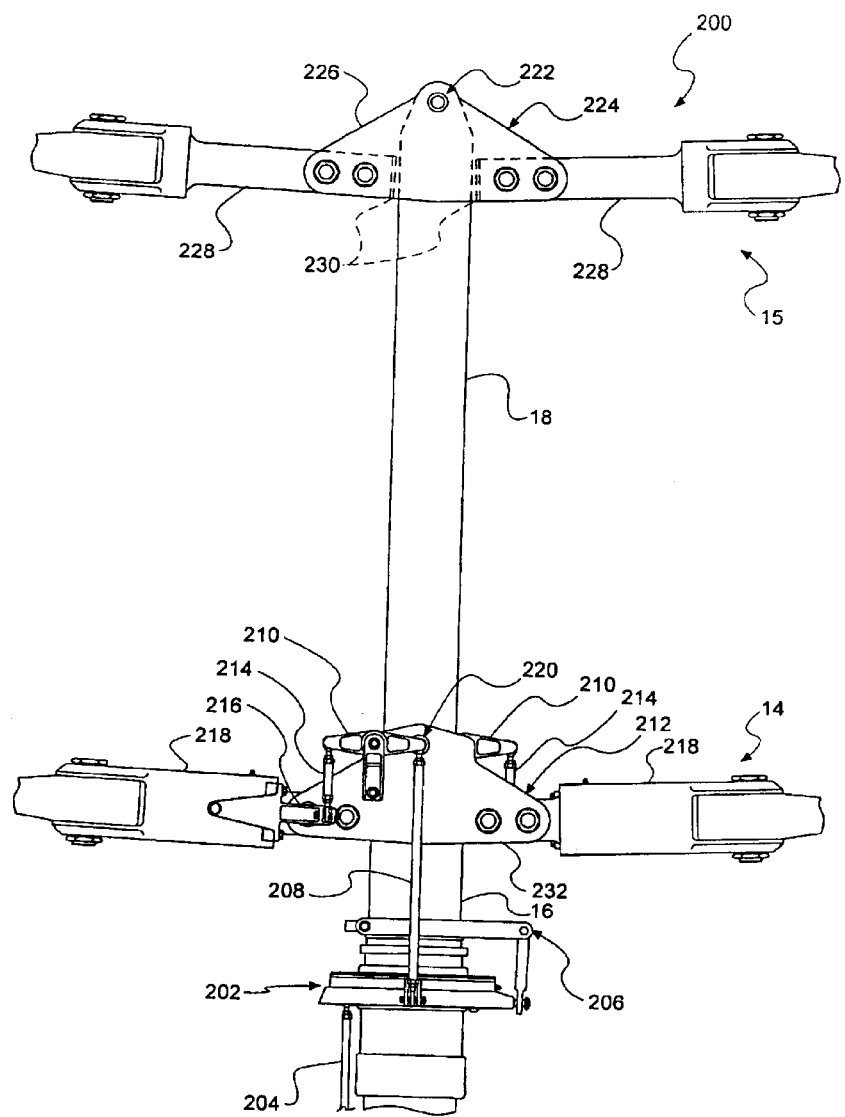
FIG. 8 is a side elevation view, partially in cut-away, of a control system for a coaxial rotor set in accordance with one embodiment of the invention.

With reference to FIG. 8, in another embodiment the invention is implemented in a coaxial rotor set 200 having a lower rotor 14 and an upper rotor 15. Cyclic pitch control is provided to the lower rotor only as in the previously-described embodiment. This is by means of a swash plate 202 and control links 204 (another link is disposed directly behind the link appearing in the figure). The control links are spaced apart 90 degrees apart with reference to rotation of the rotor set, but appear to line up in the figure. The swash plate is conventional, and further includes a dragline assembly 206.

The swash plate 202 transfers blade pitch control inputs to the lower rotor 14 via pushrods 208 (one is shown, the other is directly behind and on the opposite side of the rotor shaft 16), rockers 210 carried by the hub 212, and links 214 connected to pitch control arms 216 of rotatable pitch housing 218 rotatably attached to the hub. The rotor hub is teeterably attached to the outer shaft 16 and teeters about a teetering axis though a pivot point 220, a pivot pin being located behind an upper end of the pushrod 208 in the figure. This provides an underslung rotor system. The amount of teetering is limited, and damped, so that clearance between the lower rotor 14 and the upper rotor 15 is maintained as before described.

The upper rotor 15 is teeteringly connected to the inner shaft 18 at a pivot point 222, and also comprises an underslung rotor system. Teetering of the upper rotor is also damped and limited in the upper hub 224 to provide stability and prevent rotor contact.

This configuration is simple and provides pitch and roll control, and while the rotors 14, 15 must be sufficiently separated and the teetering of the rotors limited, it is lightweight and control is straightforward. Yaw control provisions comprise one or more yaw paddles, as described above.

In further detail, the top hub 224 further comprises two plates 226 disposed on either side of the inner drive shaft 18, bolted together through upper rotor clevis 228. Elastomeric elements 230 can be provided to damp and limit teetering. Likewise, similar arrangements are provided at the lower rotor hub 212, including using plates 232, elastomeric elements similarly disposed (not shown), bolted as provided on the upper rotor hub. As will be appreciated, numerous different arrangements for implementation can be provided, depending on factors such as size of the aircraft, materials used, weight considerations, etc.

Figure 9:
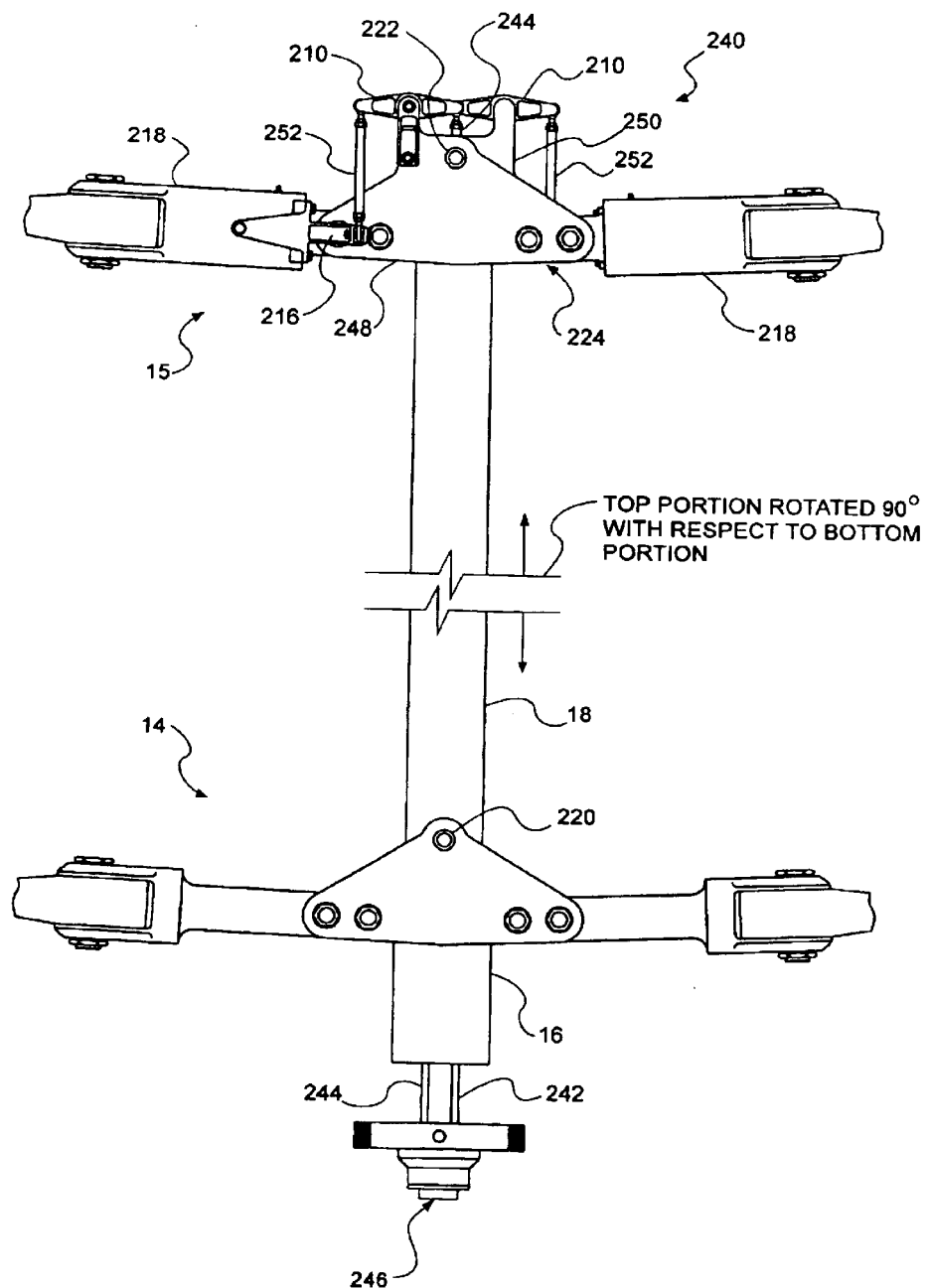
FIG. 9 is a side elevation view, partially in cut-away, of a control system for a coaxial rotor set in accordance with one embodiment of the invention, a top portion being shown rotated 90° degrees with respect to a bottom portion.

Turning now to FIG. 9, in another embodiment a similar system 240 is provided. However, the cyclic pitch control is provided to the upper rotor 15, rather than the lower rotor 14. This is done by means of control rods 242, 244 which extend up through the inner drive shaft 18. The rods are actuated by a wobble plate 246. The wobble plate is conventional, and for simplicity of illustration numerous associated control elements are not shown as will be appreciated by those skilled in the art. The control rods are operatively connected to rockers 210 carried by the plates 248, 250 of the upper rotor hub 224. The rockers transmit control forces to blade pitch control arms 216 extending from rotatable pitch housings 218 by push rod control links 252, whereby blade pitch control inputs are transferred to the upper rotor 15.

The control rods 242, 244 are carried within the inner drive shaft 18 as mentioned, and this can be accomplished in a number of ways. The control rods are alternately in tension and compression as they rotate around an axis of rotation of the rotors 14, 15; and they optimally are laterally stable, or are stabilized, in compression. Two tunnels (not shown) can be provided in a solid shaft, each containing one of the rods and a layer of lubricant between the rod and the tunnel inner wall. In another embodiment a tubular drive shaft can be used with an insert embodying two tunnels. The insert can be formed of a lightweight and/or lubricious material. The insert can be a solid extrusion, a clam-shell, or comprise a plurality of pieces. Alternatively, the control rods can be made of larger diameter than that shown, and can be solid, tubular, or of composite configuration, so that lateral deflection in compression is minimized; and in this case clearance is provided between the rods and the inner wall of the tubular drive shaft and each other so that they do not strike each other. In another embodiment (not shown) the pitch control system can be configured so that the control rods are loaded only in tension, for example by linking the rockers 210 at the upper rotor hub 224 so that as one is pulled down the other is pulled up.

Returning to the embodiment shown in FIG. 9, the upper rotor hub 224 teeters about a pivot point 222, the pivot also providing connection of the hub to the driveshaft 18. An underslung rotor configuration is provided. As before described, teetering is limited, and may be damped by elastomeric elements (not shown).

The bottom rotor 14 is mounted by a pivot 220 to the outer drive shaft 16. Except for the change of position from top to bottom, the lower rotor is substantially as described above with respect to the upper rotor of FIG. 8. Likewise, the system 240 of FIG. 9 operates essentially as the system 200 of FIG. 8, except that cyclic control is provided to the upper rotor, rather than to the lower rotor.

Figure 10:
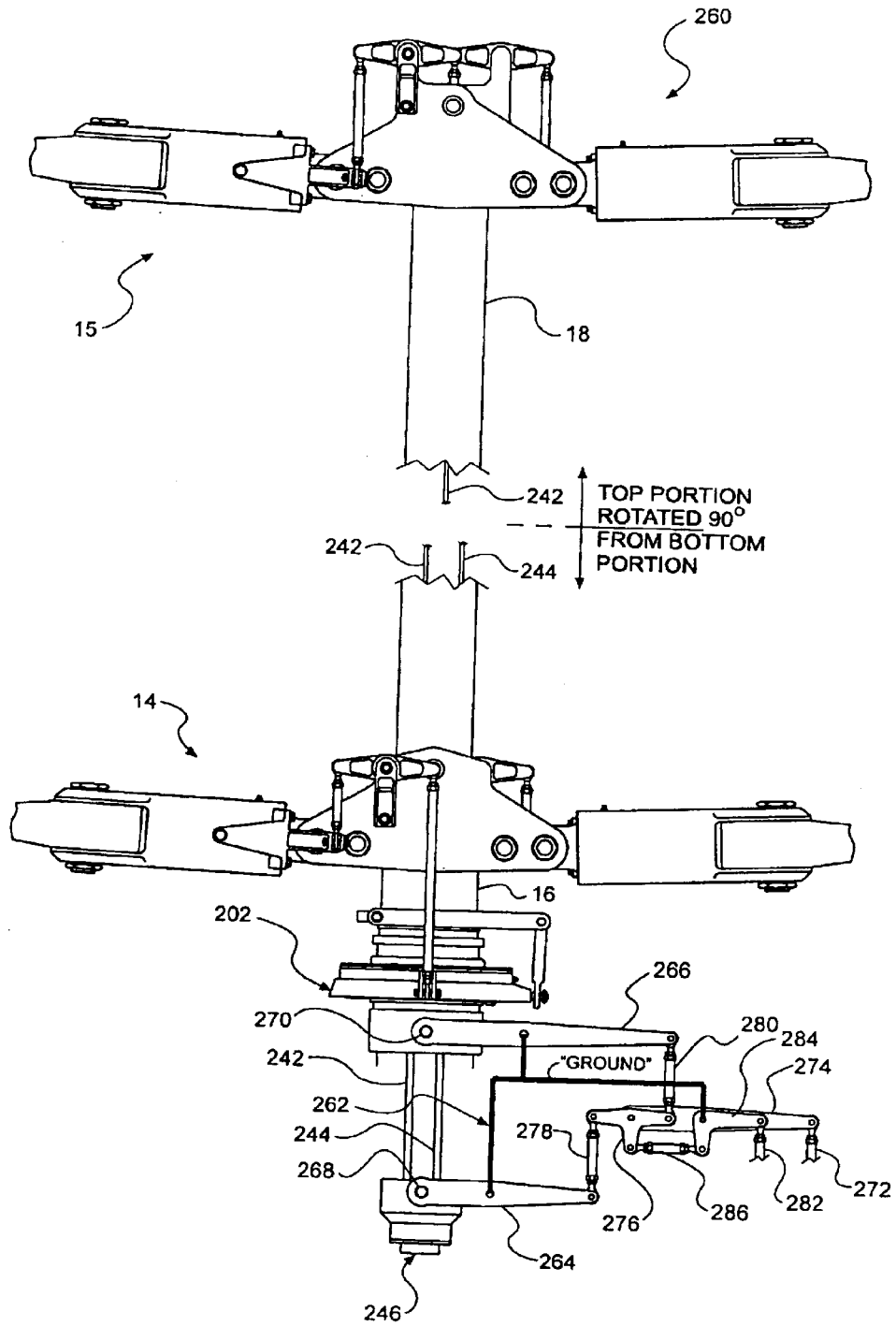
FIG. 10 is a side elevation view, partially in cut-away and partially shown schematically, of a control system for a coaxial rotor set in accordance with one embodiment of the invention, control links to a lower wobble plate being omitted for clarity, and certain supporting structure of illustrated control linkages being represented by a schematic "ground" line interconnecting pivot attachment points, and a top portion of the coaxial rotor set being shown rotated 90° degrees with respect to a bottom portion.

Turning now to FIG. 10, in another embodiment a control system 260 is provided in which and collective blade pitch control is provided for the upper rotor 15 and lower rotor 14, and cyclic pitch control is provided for the upper rotor 15. The upper rotor of the system is substantially identical with the upper rotor of the system 240 described above in connection with FIG. 9. Likewise, the lower rotor 14 is substantially identical to that described above in connection with the system 200 illustrated in FIG. 8, with the exception that collective control only, rather than cyclic pitch control, is used on the lower rotor of the system illustrated by FIG. 10. The control rods 242, 244 extending up through the inner drive shaft 18 must transmit both tension and compression forces, and the above discussion regarding them applies with the exception of the embodiment mentioned where they are only loaded in tension.

As will also be appreciated, in the embodiment shown in FIG. 10 much supporting structure is not shown. The omitted structure is represented by a schematic "ground" 262, which pivotably carries the illustrated control elements, which will be more particularly described below.

Collective control inputs are transferred to the upper and lower rotors by collective yokes 264, 266, respectively, which incorporate provisions for cosine effects in transferring rotational motion to a translational (up and down) motion of the wobble plate 246 and swash plate 202. Pivot attachments 268, 270, are provided at the inner connection between the yokes 264, 266 and the wobble plate and swash plate 246, 202, respectively. As was the case above, the cyclic control inputs to the wobble plate are conventional and are omitted for clarity.

Collective control inputs are provided by a collective control rod 272 via a collective pivot arm 274 pivotably mounted to the aircraft ("ground") 262, a first differential bell crank 276 pivotably carried by the collective pivot arm, and push rods 278, 280 providing pivotable links between the first differential bell crank and the collective yokes 264, 266 for the upper and lower rotors, respectively.

A differential collective control is provided by a differential collective (yaw) control rod 282 pivotably connected to a second bell crank 284 pivotably carried by the collective pivot arm 274 and operatively connected to the first differential bell crank 276 by a differential collective push rod 286 pivotably disposed therebetween to provide a control input link.

As will be appreciated, collective control inputs coming in through the collective control rod 272 are equally transferred to the collective yoke 264, 266 of the upper and lower rotors, respectively, and this increases or decreases the magnitude of the thrust from the rotor set system 260. A means for control of yaw by the system is by providing a difference of collective pitch in the upper and lower rotors through the differential collective control rod 282, which differentially actuates the collective yokes of the upper and lower rotors by pivoting the first differential bell crank 276, causing the push rods 278, 280 connected to the lower and upper, respectively, collective yokes to move in opposite directions by a small amount. As will be appreciated, the yaw control input is independent of the collective control input.

Figure 11:
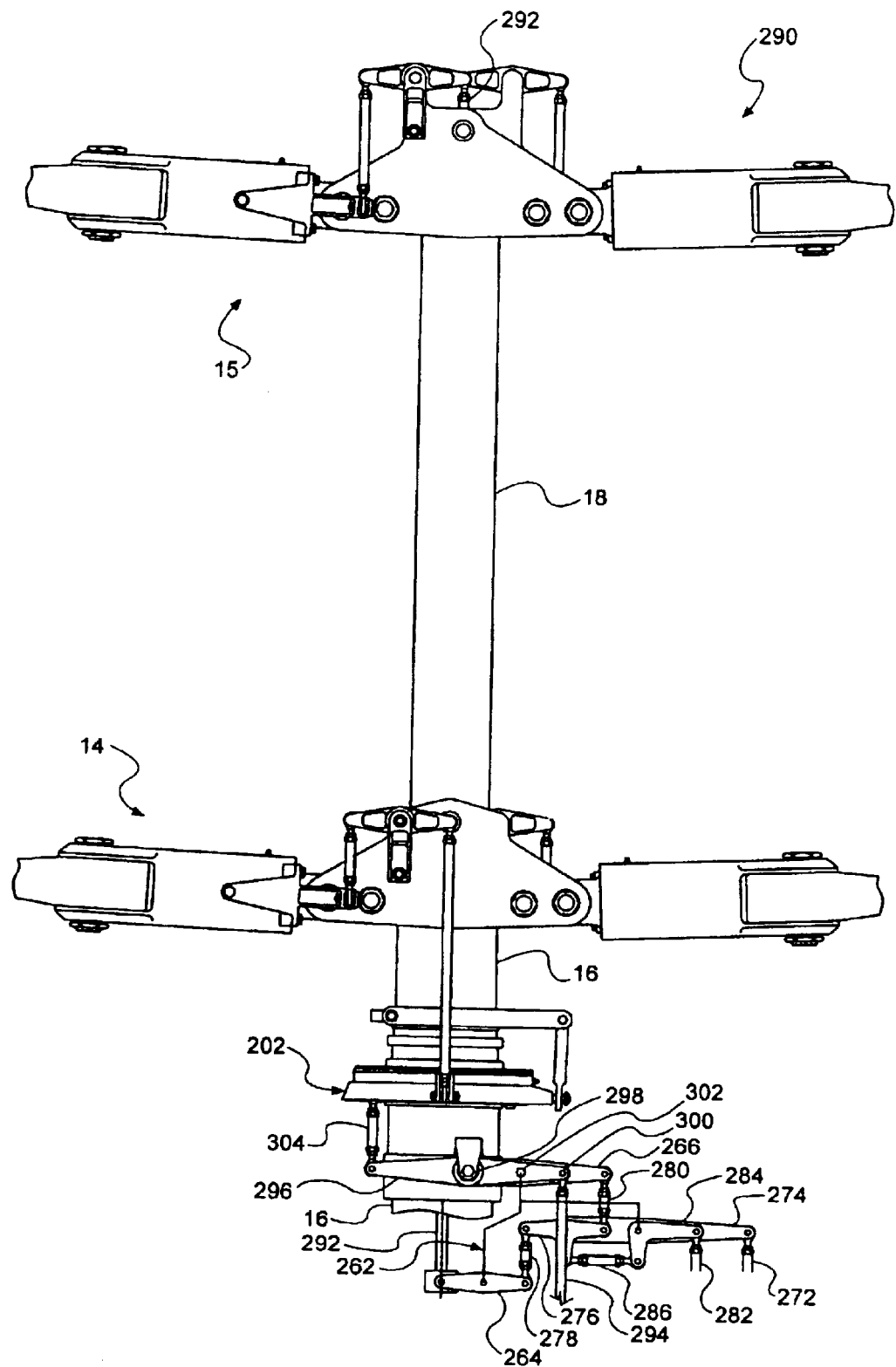
FIG. 11 is a side elevation view, partially in cut-away and partially shown schematically, of a control system for a coaxial rotor set in accordance with one embodiment of the invention, certain supporting structure of illustrated control linkages being represented by a schematic "ground" line interconnecting pivot attachment points.

Turning to FIG. 11, in another embodiment, a control system 290 comprises provisions for collective pitch control inputs to both the top rotor 15 and bottom rotor 14, and has cyclic pitch control inputs to the bottom rotor only. The top rotor 15 is substantially as before described in the system 240 illustrated in FIG. 9, except that the top rotor 15 of the present system 290 of FIG. 11 can have collective control input from a single collective control push rod 292 extending upwardly through the inner drive shaft 18. The lower rotor 14, from the swash plate 202 up, is substantially the same as that described above in the system 200 illustrated in FIG. 8. However, the controls for this system 290 illustrated in FIG. 11 differ somewhat from that discussed above.

The control linkages to be described below are pivotably connected to additional structure not shown, but again will instead represented schematically by a "ground" line 262. Collective control inputs are applied through a collective control rod 272 to a collective control lever 274 which is pivotably carried by "ground" 262. Collective is transferred to the swash plate 202 of the lower rotor 14 by a collective yoke 266, which is pivotally carried by "ground" at a pivot point 302 and attached to the swash plate 202 in a manner similar to that described above in connection with the system 260 illustrated and described in connection with FIG. 10. However, the connection (270 in FIG. 10) of the yoke to the swash plate is hidden behind other structure in FIG. 11.

Collective control inputs are transferred to the upper rotor through a collective yoke 264 likewise pivotably carried by "ground" 262. Again, provision for cosine effects in the control linkages are made where necessary. The two collective yokes, 264, 266 are connected to the collective control lever as described above, so that differential collective can be applied to the system. This is supplied through a differential collective (yaw) control rod 282 as described above. The other control structures associated with the collective controls are substantially as described above also, and the description will not be repeated.

Cyclic control inputs to the lower rotor 14 are applied through cyclic control rods 294 disposed on either side of the control arrangements (only one rod is shown, the other rod being directly behind it on the opposite side of the apparatus shown.) Cyclic control inputs are transferred through a cyclic control levers 296 (an identical lever is positioned directly behind on the far side of the shaft in FIG. 11) pivotably carried by the collective yoke 266 at a pivot 298. To clarify, the collective control yoke 266 pivots about a pivot point 302 carried by ground 262 (the pivot point 302 is shown in the figure for clarity, but actually is hidden behind the cyclic control lever) and forks are disposed on the opposite sides of the swashplate apparatus, and pivotably connected thereto. Allowance is made for cosine effects, but for clarity in the figure, this structure is not shown. Furthermore, a pivotable attachment point 300 of the collective control rod 294 to the collective control lever 296 is shown displaced from the pivotable connection point 302 of the collective yoke 266 with "ground" 262. The two can coincide or be so located with respect to each other so that collective control input does not substantially directly affect cyclic control input. For example the two pivot points can be located so that the pivot point 298 of the cyclic lever is intermediate the pivot point 302 of the collective yoke 266 and the pivot connection (not shown) to the swashplate assembly 202 so that the cyclic linkage will rise or fall by the same amount as the swashplate, but for cosine effects. Again, these considerations hold true for the arrangements for the collective lever 296 on the near side (shown) and on the far side hidden directly behind that shown.

Push rods 304 pivotably couple the collective control levers 296 to a non-rotating portion of the swash plate 202. As discussed above in connection with the system shown in FIG. 8, the push rods are disposed on the near and far side of the apparatus shown and in the figure directly overlap, so that the pushrod 304 behind the one shown is hidden. Nevertheless, the two are spaced apart angularly with respect to the axis of rotation of the driveshafts 16, 18 by 90 degrees, so that pitch and roll inputs are effected by there up and down movement.

The system 290 shown in FIG. 11 as well as that shown in the previous FIGS. 8–10, provide good control of a coaxial helicopter with simplified arrangements as compared with conventional coaxial designs where collective and cyclic pitch control are provided to both top and bottom rotors, 15, 14, respectively. Yaw control can be provided by, or in the case of the embodiments of FIGS. 10 and 11 be supplemented by, use of tiltable tail fins (not shown) or the like, acting as yaw paddles in the downwash from the coaxial rotor set 12.

Figure 12:
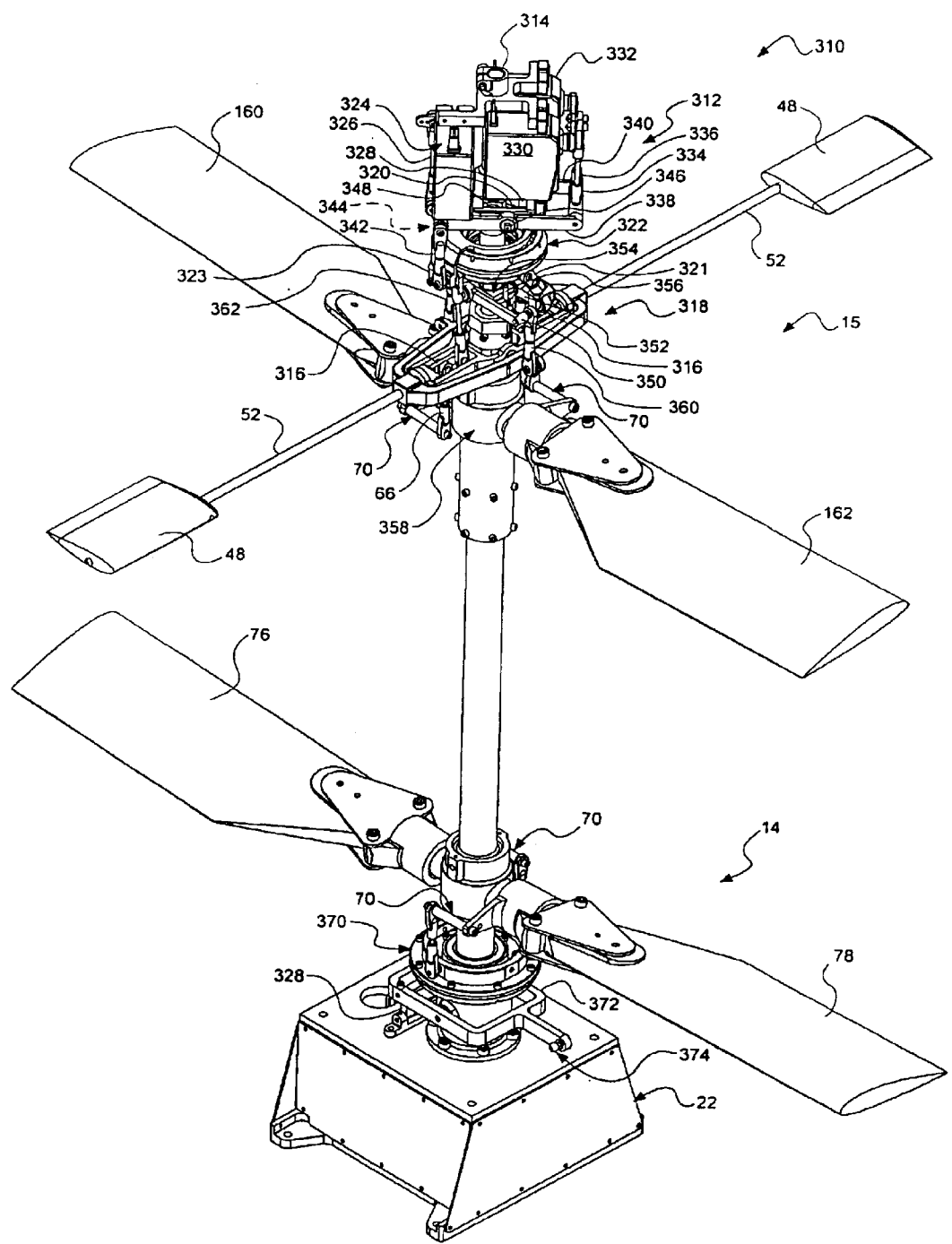
FIG. 12 is a perspective view, partially in cut-away, of another embodiment in accordance with principles of the invention, where cyclic is provided to the upper rotor using a "Beller" system, and collective is provided to both upper and lower rotors, some control links and structure of the aircraft being omitted for clarity.
Figure 13:
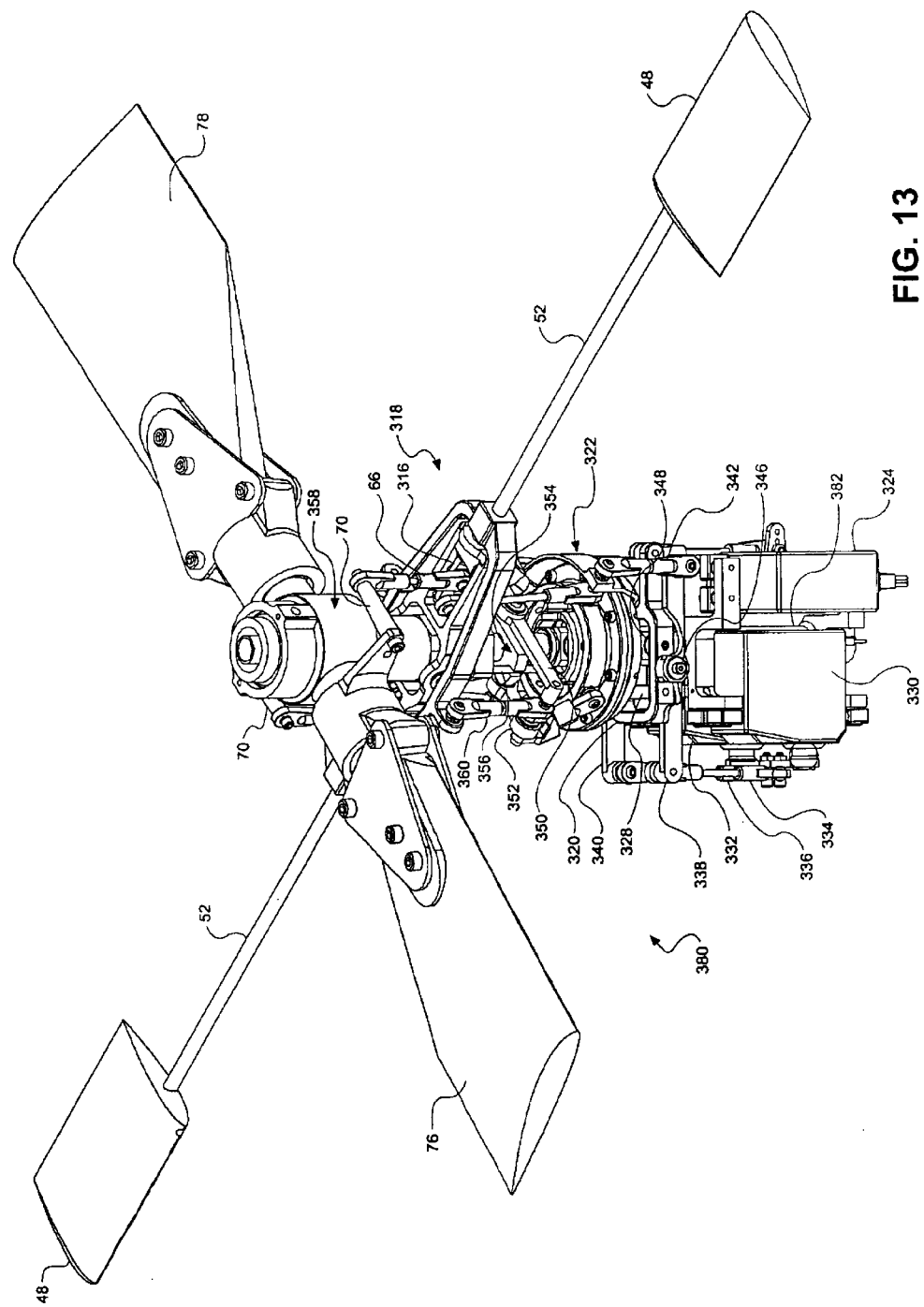
FIG. 13 is a perspective view, partially in cut-away, of an alternative embodiment to that of FIG. 12, wherein cyclic and collective blade pitch control is provided for the lower rotor and collective only is provided to the upper rotor. The upper rotor is omitted for clarity.

With reference now to FIG. 12, in another embodiment a control system for a rotor set 310 is provided where cyclic and collective blade pitch control is provided to an upper rotor 15 by means of an actuator assembly 312 disposed above the upper rotor. The actuator assembly is carried by a non-rotating tube 314 extending through the inner drive shaft 18. As will be appreciated, the control system is of the Bell-Hiller, ("Beller") type, with mixing arms 316 pivotably carried within a teetering Hiller paddle assembly 318. An upper collective yoke 320 moves an upper swashplate assembly 322 up and down when actuated by a collective proportional servo 324 of the actuator assembly, via a push rod 326. The upper collective yoke is pivotably attached to the actuator assembly by a pivotable link 328, so as to allow for cosine effects. The general scheme is substantially the same as that of the collective control linkages of the lower rotor 14 in FIG. 13 which will be discussed below. In fact, if FIG. 13 is inverted, additional details of the system can be appreciated; because the system shown there is in essence a mirror image of the upper rotor control scheme of the system shown in FIG. 12.

Continuing with discussion of the embodiment of FIG. 12, pitch and roll control inputs to the swashplate 322 are provided by proportional servos 330, 332 through ball-jointed push rods 334, 336, compensating lever arms 338, 340, and ball-jointed push rods 342, 344 (344 is hidden behind 342 in the figure) disposed between the compensating lever arms and a non-rotating portion of the swashplate 322. The ball-jointed connections of the push rods to the swashplate are separated by 90 degrees rotation, but line up in the figure. The compensating lever arms 338, 340 are pivotably connected to the collective yoke 320 on a pivot axis through pivot pins 346 located intermediate the pivotable connection to the pivot link 238 and a pivotable connection 348 of the collective yoke to the swashplate assembly 322. This provides substantially equal vertical travel for the cyclic push rods 342, 344 as that of the swashplate assembly from collective control input through the collective yoke 320. In this way cyclic inputs due to collective movement of the swashplate are minimized.

Likewise, on the rotating side of the swashplate 322, collective vertical movement of the swashplate is accommodated by providing control links to the Hiller paddle assembly 318 through ball-jointed push rods 321, 323 connected to scissor arms 350,352 of a scissor assembly 354. The scissor assembly can slide up and down over a lower portion of the swashplate assembly and the non-rotating tube 314 therein, and is rotationally stabilized so as to turn with the rotor by pins 356 carried by the upper rotor hub 358. Ball-jointed pushrods 360, 362 connect the scissor assembly to the Hiller paddle assembly. Practitioners in the art will appreciate the details of how the Beller system functions; and particularly in light of the discussion of the Hiller system above, it will further be apparent that by means of the control elements shown, including the swashplate, Hiller paddle assembly, mixing levers 316 carried thereby providing Bell and Hiller control inputs, the scissor assembly, and the associated control linkages and push rods, cyclic and collective pitch control inputs are provided to the upper rotor with a minimum of power required for the proportional servos 324, 330, 332 of the actuator assembly 312.

The upper rotor 15 is underslung, and is coned as described above. It is also damped and limited in its cyclic teetering motion as discussed above, but sufficient teetering of the upper rotor to provide required pitch and roll control is allowed. Likewise the bottom rotor 14 is underslung, coned and damped, and its freedom to teeter is also limited, even more so. Adequate distance between the rotors is provided given the amount of teetering allowed, and with these provisions the rotors are prevented from interfering.

As will be appreciated, collective control of the lower rotor 14 is provided by a lower swashplate assembly 370 vertically slidable over the outer driveshaft 16. A lower collective yoke 372 moves the swashplate assembly up and down as actuated through a ball joint 374 by a pushrod (not shown) connected to a lower rotor collective actuator, such as a proportional servo (not shown). As with the upper rotor controls, the lower rotor collective yoke is pivotably connected to the rest of the structure by a link 328 to accommodate cosine effects.

For clarity, drag-line provisions are not shown for the lower swashplate 370. In the lower rotor 14 swashplate the dragline can be a conventional pivotable linkage, or can be provided in other ways, for example providing slots, and pins or other projections sliding therein, to prevent relative rotation. In the swashplate of the upper rotor 15, a gimbel ring is used to restrain the non-rotating, proportion of swashplate assembly 322. The drive scissors assembly 354 is configured to drive the rotating portion of swashplate 322.

With reference now to FIG. 13, in an alternative embodiment, a cyclic pitch control is provided to the bottom rotor 14, and not the upper rotor (not shown). Collective blade pitch control is provided to both the upper and lower rotors. While the upper rotor is not shown, arrangements for providing collective pitch control to the upper rotor 15 can be as described above, for example as in the embodiment illustrated in FIG. 11. In another example collective control of the upper rotor in FIG. 13 can be similar to that shown for the lower rotor 14 in FIG. 12, actuated by an collective actuator assembly comprising an actuator configured similarly to that of the upper rotor collective actuator (324 in FIG. 12) described above. In this latter case, an actuator assembly and swash plate (not shown) can be provided on a non-rotating tube similar to that describe above with reference to FIG. 12. An illustration of one example of how this can be implemented is provided by turning FIG. 12 upside down and appreciating that a pushrod connected to a servo (not shown) mounted above an upper rotor configured similar to that of the lower rotor 14 of FIG. 12 would actuate the collective yoke (372 in FIG. 12) from above such an upper rotor.

Returning to FIG. 13, the arrangements for cyclic and collective control of the lower rotor 14 which are illustrated mirror those of the upper rotor in the embodiment of FIG. 12 just discussed. Like reference numbers indicate corresponding elements with those of the upper rotor of the previously described embodiment of FIG. 12. Operation of the system 380 is essentially the same as described above, except that it is inverted, and provided below the lower rotor 14 rather than above the upper rotor 15. For this reason a detailed discussion of operation will not be repeated. As will be appreciated, however, the actuator assembly can be carried by the airframe (not shown) rather than a non-rotating concentric tube extending through the center of the inner and outer driveshafts 18, 16. In one embodiment however, a non-rotating concentric tube 382 can be provided outside the driveshafts, and the actuator assembly can be carried by such a tube.

With reference now to FIG. 1, in one embodiment of the invention, where one or more yaw paddles 34, 36 are employed, and regardless of whether the control system illustrated in this figure is employed, or one of the others disclosed herein is employed in combination with yaw paddles for yaw control, there can be a tendency for the tail to dip slightly when a yaw control input is made through tilting the paddle(s). This is due to the downward vector component of the forces on the yaw paddles when they are tilted, and their position away from the center of gravity of the helicopter 10. This is not generally objectionable as it is usually only a slight dip, most of the tendency to dip being mitigated by the stabilizer bar configuration provided on the cyclically controlled rotor (14 in FIG. 1). Further, this dip can be anticipated and corrected for by the operator. However, a correction can be made in the control system to further mitigate this tendency of the tail to dip by providing a gyro in the pitch axis to provide a cyclic control input to correct for a dip (or a rise, due to a crosswind for example) of the tail not intended by an operator. This pitch axis gyro can supplement a yaw axis gyro (or heading-hold gyro) for correcting for crosswinds etc, which tend to turn the aircraft, discussed above.

As will also be appreciated, adaptations of other known cyclic pitch control methodologies can be substituted for those shown as examples herein. For example, a fixed-pitch system with the flybar mounted to the hub (not shown) can be used on the cyclic-controlled rotor in a non-collective embodiment. As will be appreciated, in a fixed-pitch Hiller system, for example, the control linkages are simplified. The coaxial helicopter described herein has a smaller diameter rotor than that of conventional designs, and higher disk loading. An advantageous trade-off that can be exploited is that variation of rotor thrust by variation of motor speed alone is easier, as there is less lag time required to increase or decrease rotational speed of the smaller-diameter rotors. Accordingly, using a fixed pitch cyclic control system is a viable implementation strategy.

Other well-known variations on the Bell, Hiller, Bell-Hiller ("Beller"), systems can be used to provide cyclic control of one rotor only. Having shown that cyclic control of only one rotor is viable in a coaxial system (contrary to conventional wisdom), it is possible to implement the system in ways other than the specific examples disclosed herein.

A further advantage realized in embodiments where only one rotor has cyclic control. Systems in accordance with principles of the invention address a potential problem of stabilizer bars for the upper and lower rotors fighting each other. In extreme cases observed in experimental models, the helicopter can become destabilized and even tumble, due to this problem. Cyclically controlling only one rotor eliminates one stabilizer bar, and hence the problem observed in previous systems.

Another way to implement the invention is to provide cyclic and collective pitch control on one rotor only. This could be done as described above in connection with the various exemplary embodiments, only leaving off the collective control provisions for the collective-only rotor. Introducing a small collective input to one rotor introduces an unbalanced torque, and enables yaw control. However, it will be appreciated that it also changes the thrust vector, causing the aircraft to rise and fall with each yaw input. This burdens the pilot with anticipating and correcting for the effect. To mitigate this problem in this embodiment, some provision for correction can be incorporated in the control system.

One way to correct for rising and falling due to providing collective to one rotor is to provide an inertial sensor (not shown) and control the motor speed based on sensor output and control inputs to speed-up or slow the motor to correct any rise or fall that is not operator-initiated. This scheme addresses the problem but is not fully effective because of lag in response of the aircraft to motor-speed control inputs. Even though coaxial helicopters have better response than conventional helicopters because of their smaller-diameter rotor disks, there is still some delay. An inertial sensor will not initiate a control signal unless the aircraft has actually begun to rise or fall, therefore some continuing rise and fall will be experienced during the lag. For this reason, another way to mitigate the problem of rising and falling is to provide control position sensors which sense a yaw control input, and program the system to immediately increase or decrease motor speed as required in anticipation of rising or falling. The inertial sensor system just discussed can be incorporated in this system, and can be used in a feed-back loop to further refine control of the aircraft.

Another way to approach the problems of using collective on one rotor only is to look at it in terms of providing a control input for correcting induced yaw when collective is used, such as providing a yaw axis gyro (not shown), and providing an independent means for yaw correction, such as yaw paddles 34, 36, a small tail rotor, or other means as will be discussed below. One way of looking at this scheme is that operator yaw control inputs are essentially added (or "subtracted") from those of the gyro constantly being applied to correct induced yaw from other control inputs (such as collective) and/or crosswinds, etc. Whereby, differential torque introduced by collective input to one rotor only is corrected by tilting the yaw paddles, for example; and this is further modified by yaw control inputs from the operator. As an example, in pure hover, the operator yaw control inputs would essentially be completely effected by tilting the yaw paddles. In rising and descending by collective control inputs only, the yaw control inputs would essentially be from gyro signals only. In rising or descending as well as yawing the aircraft at the same time, the yaw paddle control inputs would be a mix of operator and gyro control inputs. This can be done in electronics, and the control algorithms can be incorporated in an embedded system such as a programed microcontroller using one or more pre-programed microprocessors. Such electronic control systems are known, and can be adapted to address this control problem.

Figure 14:
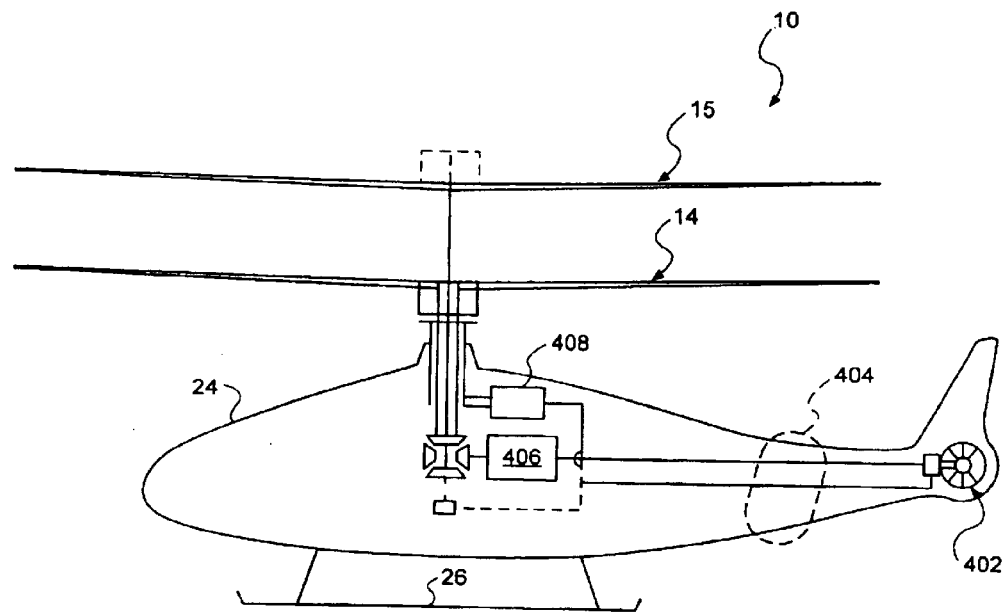
FIG. 14 is a schematic left elevation view of a helicopter incorporating another embodiment of the invention.
Figure 15:
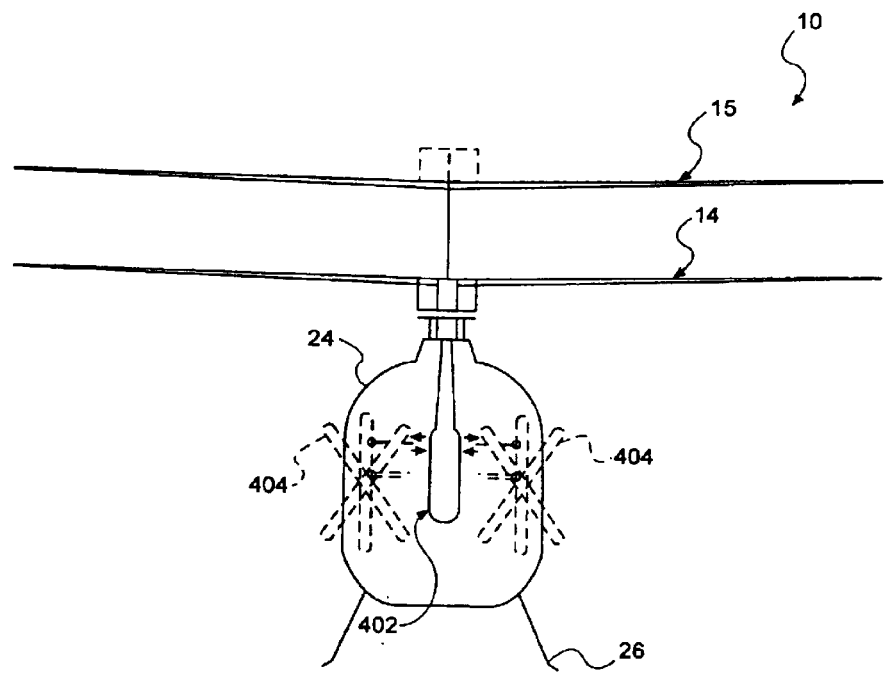
FIG. 15 is a schematic rear elevation view of the helicopter of FIG. 14.

In another embodiment, shown schematically in FIGS. 14 and 15, a fully reversible blade pitch tail rotor 402 is used instead of, or in combination with, yaw paddles 404. Otherwise the system is essentially the same as before described. A motor 406 provides power to the rotors 14, 15 and the tail rotor, and a control system 408 controls the rotors and tail rotor. If the reader is tempted to question what the advantage of the system disclosed herein is if a tail rotor is provided, the reader will appreciate that there are substantial advantages upon consideration of the following points. First, the tail rotor is only drawing substantial power when actuated to yaw the aircraft, enabling it to "snap around," or, when collective is temporarily applied to one rotor only, essentially operating briefly as a conventional helicopter, and/or when a yaw control input is applied by a rate or heading-hold gyro, again a brief duration event. Thus the system, when provided with a tail rotor, provides a sought-after instantaneous yaw response, without the constant power drain-off to the tail rotor of conventional systems. Second, the tail rotor can be smaller than conventional tail rotors. Particularly in the following two situations: a) where no collective is applied to either of the two rotors;

and, b) when collective is applied to both so that collective is either balanced or is operating deferentially to supplement, not fight, yaw force moment vectors supplied by yaw paddle(s), or a tail rotor, or both. As will be appreciated, depending also on how far away from the rotor axis it is located, the tail rotor can be quite small compared with conventional designs.

The tail rotor 402 is fully reversible, and considerable blade pitch change is allowed in each direction. Further, the tail rotor can be configured as a ducted fan as shown and as is known in the art.

Figure 16:
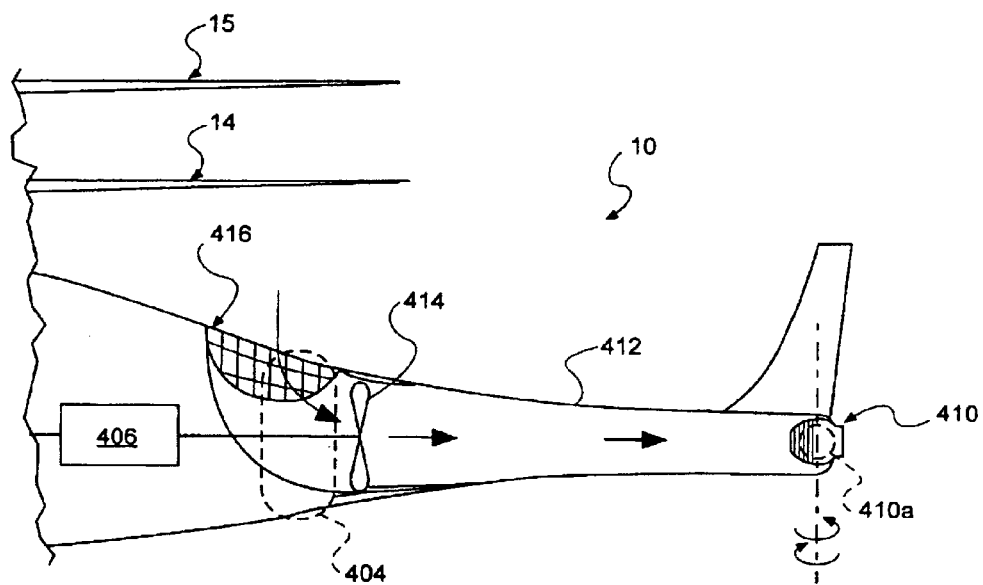
FIG. 16 is a schematic left side elevation view, partially in cut-away, of a tail boom in another embodiment of the invention, illustrating a hollow tail boom and a fan arrangement to provide a directed air jet at a rear end of the tail boom for yaw control; and, FIG. 17 is a schematic left side elevation view, partially in cut-away, of a tail boom and tail rotor in another embodiment of the invention.

In another embodiment, illustrated schematically in FIG. 16, rather than a tail rotor (not shown) a nozzle 410 providing a directed air stream can be used to provide yaw control or to supplement other yaw control provisions provided, such as yaw paddles 404. For example a hollow tail boom 412 is provided, with a movable nozzle disposed on a rear end of the boom. Air from a fan 414 drawing from an intake 416 is fed down the tail boom and is directed by the nozzle to provide a right or left-directed yaw moment force, or is directed rearwardly to enhance forward flight, or a direction to provide a combination of these. For example the nozzle can be directed full left, as indicated by reference number 410*a* and shown as a dashed line, to yaw the helicopter 10 counter-clockwise about its yaw axis.

Figure 17:
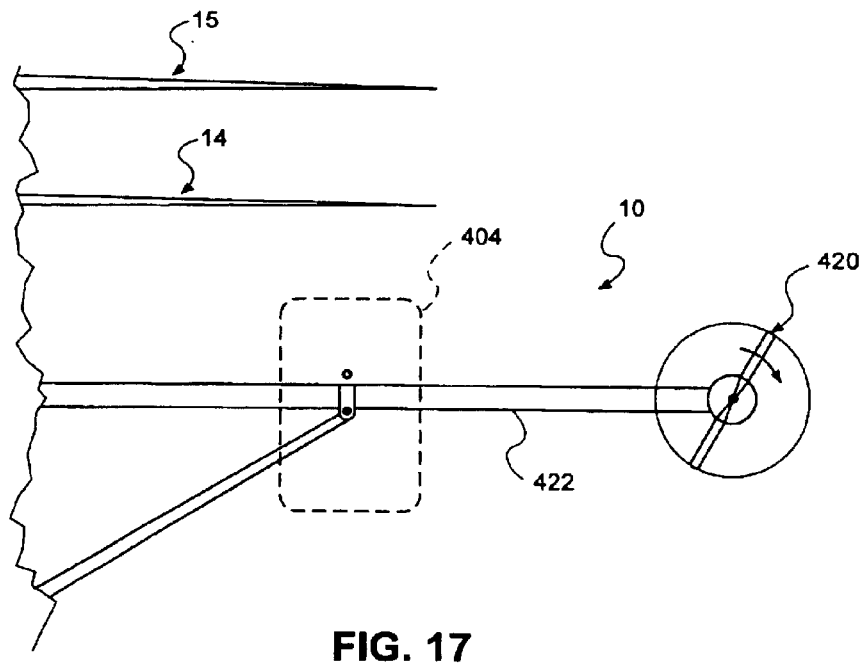

With reference to FIG. 17, it will be appreciated that a tail rotor 420 can be provided in an arrangement of more conventional appearance, including a tail boom 422 carrying the rotor at its rearward end to maximize the distance from the axis of the rotors 14, 15. Again, the tail rotor blade pitch is fully reversible. The rotor diameter can be smaller, and because it is only employed for brief periods, it does not require the aerodynamic efficiency of a conventional tail rotor, which is essentially constantly working. Larger attack angles are used, but only for short periods. Again, the tail rotor can be supplemented by yaw paddles 404, which provide directional stability in addition to providing additional yaw control.

As will be appreciated from the foregoing, advantages can be realized from incorporation of a control system in accordance with the invention in a helicopter vehicle 10. Although unconventional, providing cyclic control of only one rotor of a coaxial helicopter can lead to savings in simplification, and/or an increase in performance, by additional modifications to a conventional coaxial helicopter control system made possible by such a single-rotor-cyclic control scheme. The various exemplary embodiments disclosed illustrate the advantageous modifications thus made possible.

While specific embodiments of the invention have been illustrated and described, it will be apparent to those skilled in the art, that various modifications and changes in the arrangements and details of implementation can be made without departing from the spirit and scope of the invention.

What is claimed is:

1. A helicopter having a coaxial rotor set, comprising;
   a first teeterable rotor carried by a first shaft;
   a second teeterable rotor carried by a second shaft;
   wherein the first rotor is configured for cyclic pitch control, and the second rotor does not have cyclic pitch control, whereby pitch and roll control of the helicopter by means of the coaxial helicopter rotor set is effected by cyclic pitch control of the first rotor.

2. A helicopter as set forth in claim 1, further comprising an airfoil disposed in a downwash from the rotor set configured to be actuatable to deflect downwash so as to provide a yaw control in combination with pitch and roll control provided by said cyclic pitch control of the first rotor.

3. A helicopter as set forth in claim 2 wherein the rotor set does not have a collective pitch control and the airfoil comprises a primary means of yaw control.

4. A helicopter as set forth in claim 1 where the first and second rotors each further comprise a collective blade pitch control system.

5. A helicopter as set forth in claim 4, wherein the collective blade pitch control system enables a collective pitch of the first rotor to be varied with respect to the collective pitch of the second rotor so as to provide a differential collective pitch control enabling yaw control by means of varying the collective blade pitch of the rotors with respect each other.

6. A helicopter as set forth in claim 1, wherein the first rotor comprises the lower rotor of the coaxial rotor set.

7. A helicopter as set forth in claim 1, wherein the first rotor comprises the upper rotor of the coaxial rotor set.

8. A coaxial helicopter having a coaxial rotor set including a lower rotor carried by an outer drive shaft and an upper rotor carried by an inner drive shaft, comprising:
   a cyclic blade pitch control linkage operatively coupled to only one of the upper rotor and the lower rotor;
   control of pitch and roll of the helicopter being effected by said cyclic blade pitch control linkage through only one of the upper rotor and the lower rotor; and
   wherein the lower rotor and the upper rotor each have a respective diameter, the respective diameters being substantially the same.

9. A coaxial helicopter as set forth in claim 8, further comprising collective blade pitch control linkages operatively coupled to the upper and lower rotors.

10. A coaxial helicopter as set forth in claim 8, wherein the cyclic blade pitch control linkages are operatively coupled to the lower rotor.

11. A coaxial helicopter as set forth in claim 8, wherein the cyclic blade pitch control linkages are operatively coupled to the upper rotor.

12. A coaxial helicopter as set forth in claim 11, wherein a blade pitch control linkage operatively coupled to the upper rotor is disposed within the inner driveshaft.

13. A coaxial helicopter as set forth in claim 9, wherein yaw control is by differential movement of the collective blade pitch control linkages operatively coupled to the upper and lower rotors to provide differential collective blade pitch.

14. A coaxial helicopter, comprising:
   an airframe;
   a power assembly operatively connected to an inner driveshaft and an outer driveshaft;
   an upper rotor carried by the inner driveshaft and having a first diameter;
   a lower rotor carried by the outer driveshaft and having a second diameter that is substantially the same as the first diameter;
   a control system, further comprising:
      a cyclic blade pitch control linkage operatively coupled to only one of the upper and lower rotors;
      control of at least pitch and roll of the helicopter being effected by said cyclic blade pitch control linkages.

15. A helicopter as set forth in claim 14, further comprising yaw paddles carried by the airframe impinging upon a downwash from the coaxial rotor set, said yaw paddles being controllably tiltable to redirect downwash air so as to induce and control yaw motion of the airframe.

16. A helicopter as set forth in claim 14, wherein the cyclic blade pitch control linkage is operatively coupled to the lower rotor.

17. A helicopter as set forth in claim 14, wherein the cyclic blade pitch control linkage is operatively coupled to the upper rotor.

18. A helicopter as set forth in claim 14, wherein a blade pitch control linkage operatively coupled to the upper rotor is disposed within the inner driveshaft.

19. A helicopter as set forth in claim 14, further comprising collective blade pitch control linkages operatively coupled to the upper and lower rotors.

20. A helicopter as set forth in claim 19, wherein yaw control is by differential collective control of upper and lower rotors.

21. A coaxial helicopter having a first rotor and a second rotor counter-rotating with respect to the first, wherein provisions for control of the aircraft comprise:

a cyclic control for one rotor of said first and second rotors only, and no cyclic control for the other rotor of said first and second rotors;

a yaw control;

wherein pitch and roll control are provided by the cyclic control of said one rotor only; and wherein the first rotor and the second rotor each have a respective diameter, the respective diameters being substantially the same.

22. A system in accordance with claim 21 wherein yaw control is provided by at least one of: differential collective control of the first and second rotors; yaw paddles; a tail rotor; a ducted air jet.

23. A system in accordance with claim 21, further comprising a collective control of both the first and second rotors.

24. A system in accordance with claim 21, further comprising a collective control of only one of the first and second rotors, and wherein the yaw control cooperates with the collective control to provide yaw control.

25. A system in accordance with claim 21, wherein cyclic blade pitch control is provided to the top rotor of the first and second rotors.

26. A system in accordance with claim 25, wherein collective is provided to both the first and second rotors.

27. A system in accordance with claim 21, wherein the yaw control includes a reversible blade pitch tail rotor associated with the helicopter, the reversible blade pitch tail rotor being configured to cooperate with the first and second rotors to control yaw.

* * * * *